United States Patent [19]

Eagleson

[11] Patent Number: 5,064,020
[45] Date of Patent: Nov. 12, 1991

[54] DEVICE FOR HUNTING LARGE AND SMALL GAME

[76] Inventor: Bruce A. Eagleson, 109 South St., Lagrange, Ind. 46761

[21] Appl. No.: 615,067

[22] Filed: Nov. 19, 1990

[51] Int. Cl.$^5$ ............................................. A01M 31/02
[52] U.S. Cl. ........................................ 182/20; 182/116; 182/187; 182/163; 280/30; 280/47.27
[58] Field of Search ................... 182/20, 33, 116, 187, 182/188, 163; 280/47.18, 32.5, 30, 47.27

[56] References Cited

U.S. PATENT DOCUMENTS

| | | | |
|---|---|---|---|
| 3,282,375 | 11/1966 | Ray | 182/16 |
| 3,289,787 | 12/1966 | Mc Swain | 182/20 |
| 3,336,999 | 8/1967 | Mc Swain | 182/20 |
| 3,352,379 | 11/1967 | Riggs | 182/20 |
| 4,045,040 | 8/1977 | Fails | 280/1.5 |
| 4,257,490 | 3/1981 | Bandy | 182/116 |
| 4,321,982 | 3/1982 | Strickland | 182/20 |
| 4,321,983 | 3/1982 | Nelson | 182/135 |
| 4,428,456 | 1/1984 | Rohde | 182/20 |
| 4,552,247 | 11/1985 | Purdy | 182/116 |
| 4,579,198 | 4/1986 | Lee | 182/115 |
| 4,582,165 | 4/1986 | Latini | 182/20 |
| 4,742,888 | 5/1988 | Amacker | 182/116 |
| 4,787,476 | 11/1988 | Lee | 182/116 |

OTHER PUBLICATIONS

Advertisement for "Non-Typical Treestands" from Division of Alumitech Inds., Inc.

*Primary Examiner*—Reinaldo P. Machado
*Attorney, Agent, or Firm*—Jeffers, Hoffman & Niewyk

[57] ABSTRACT

A hunting device that is selectively convertible between a tree stand position and a reclined sitting position, thus providing a single apparatus for hunting both large and small game. The apparatus includes a support member, which is capable of pivoting relative to a base member, such that when the apparatus is in the reclined sitting position, the support member pivots to allow the hunter to assume the reclined position. The support member is spring biased in the upright position to allow the hunter to quickly shift from a reclined position to an upright sitting position. In the tree stand position, the base member elevates the support member against the trunk of a tree to allow the support member to serve as an elevated platform for the hunter. The base member includes a first section and a second section pivotally connected to the first section so that the apparatus may be folded into a hand-operated cart with detachable wheels. The apparatus may be additionally converted into a U-shaped support for camouflage material in which a seat is provided to allow the hunter to remain in an upright and camouflaged position while hunting small game.

18 Claims, 3 Drawing Sheets

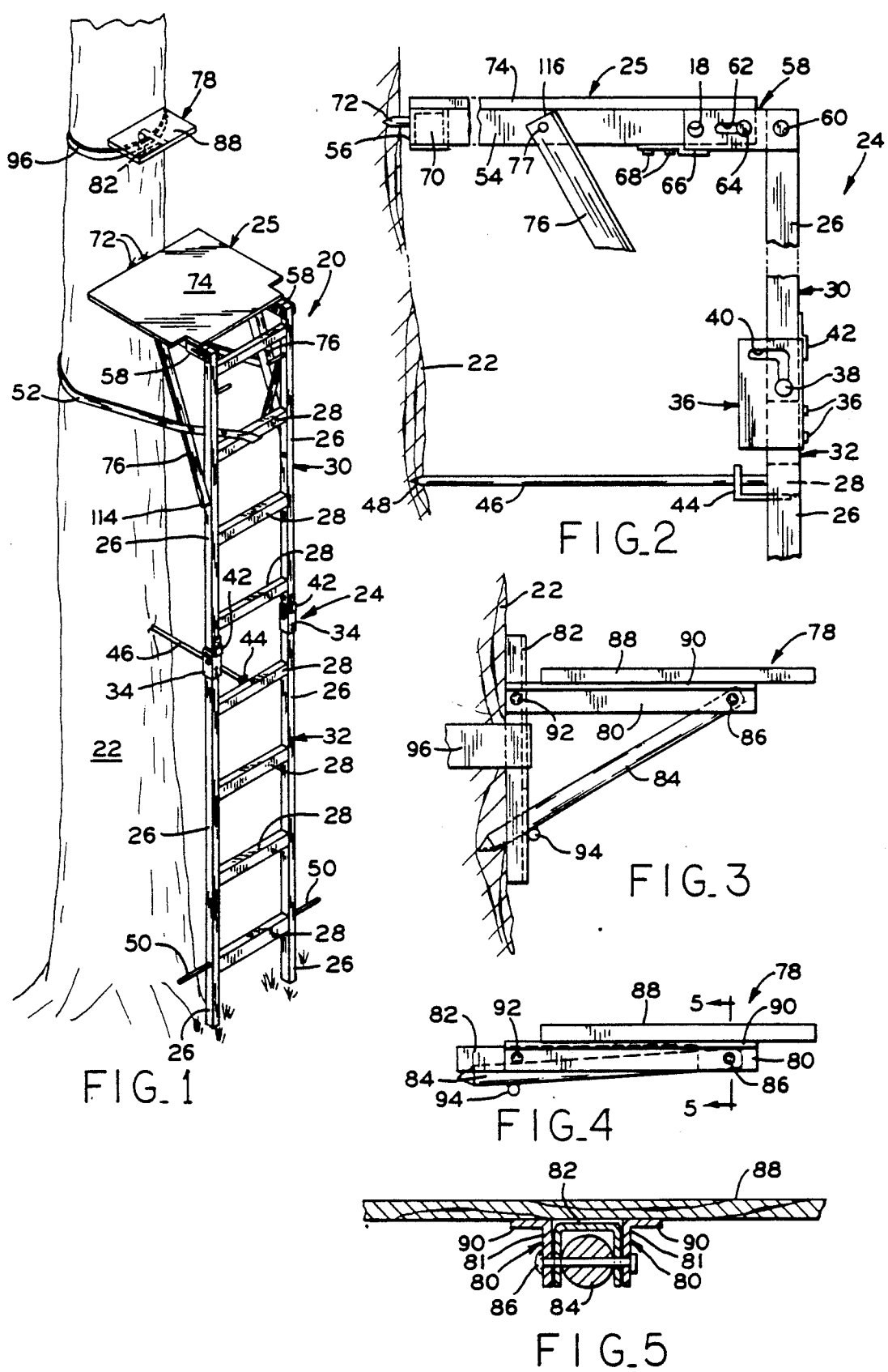

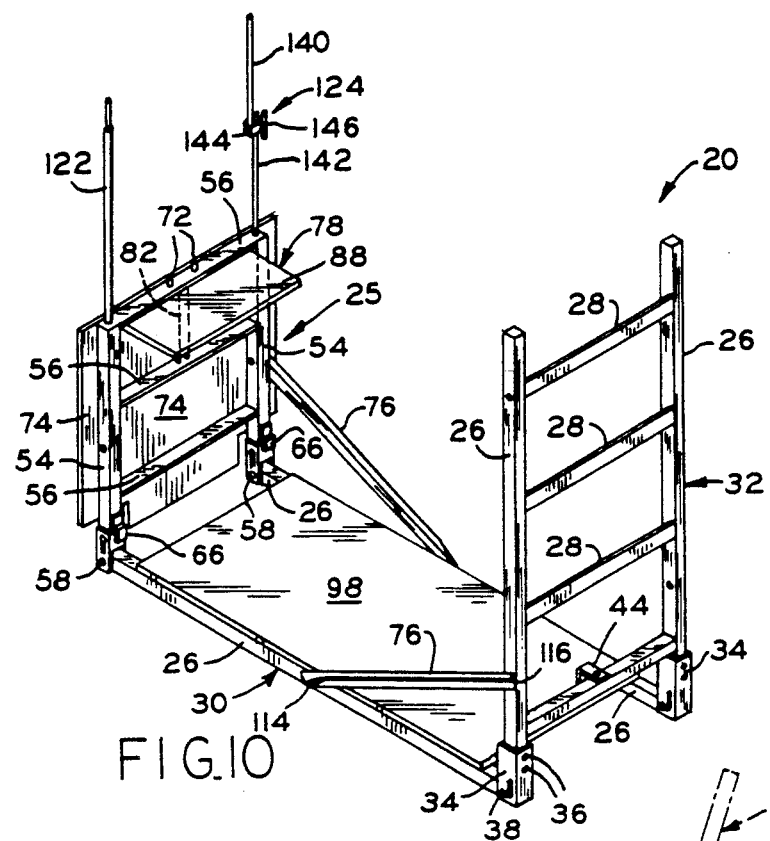
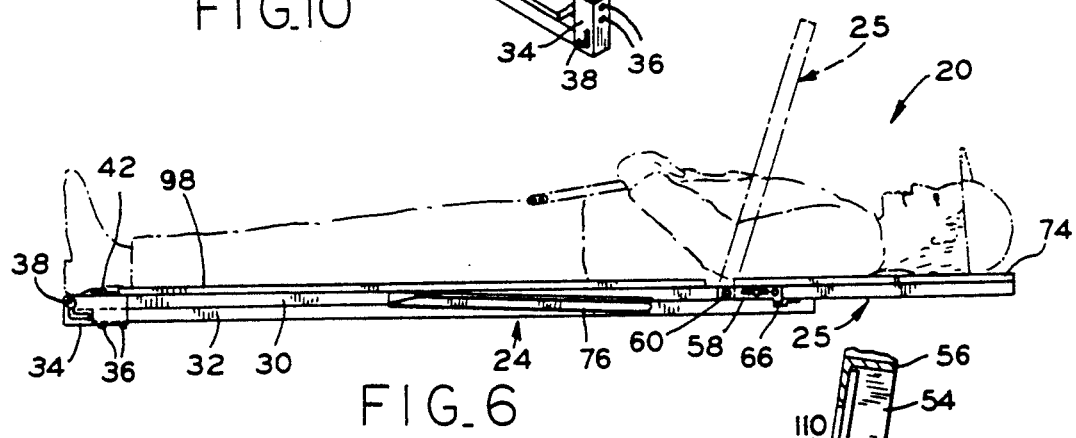
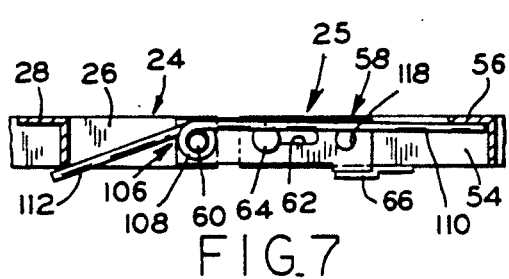
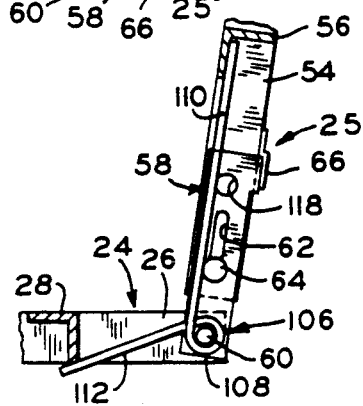
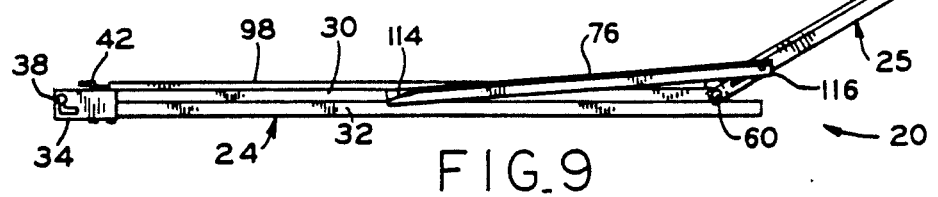

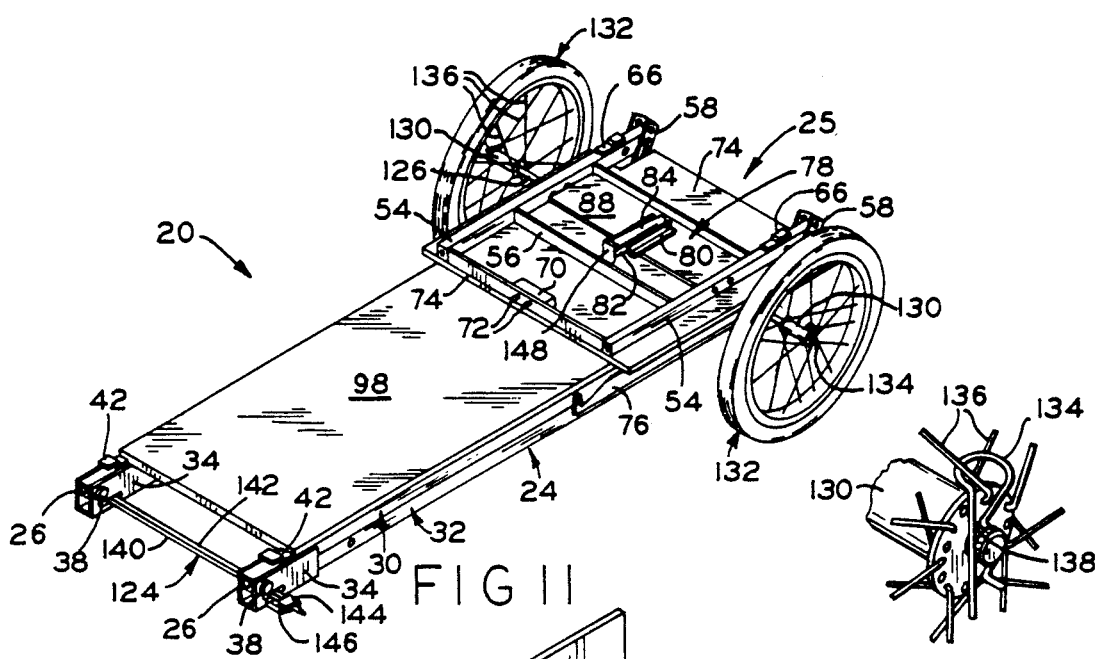
FIG 11
FIG 14
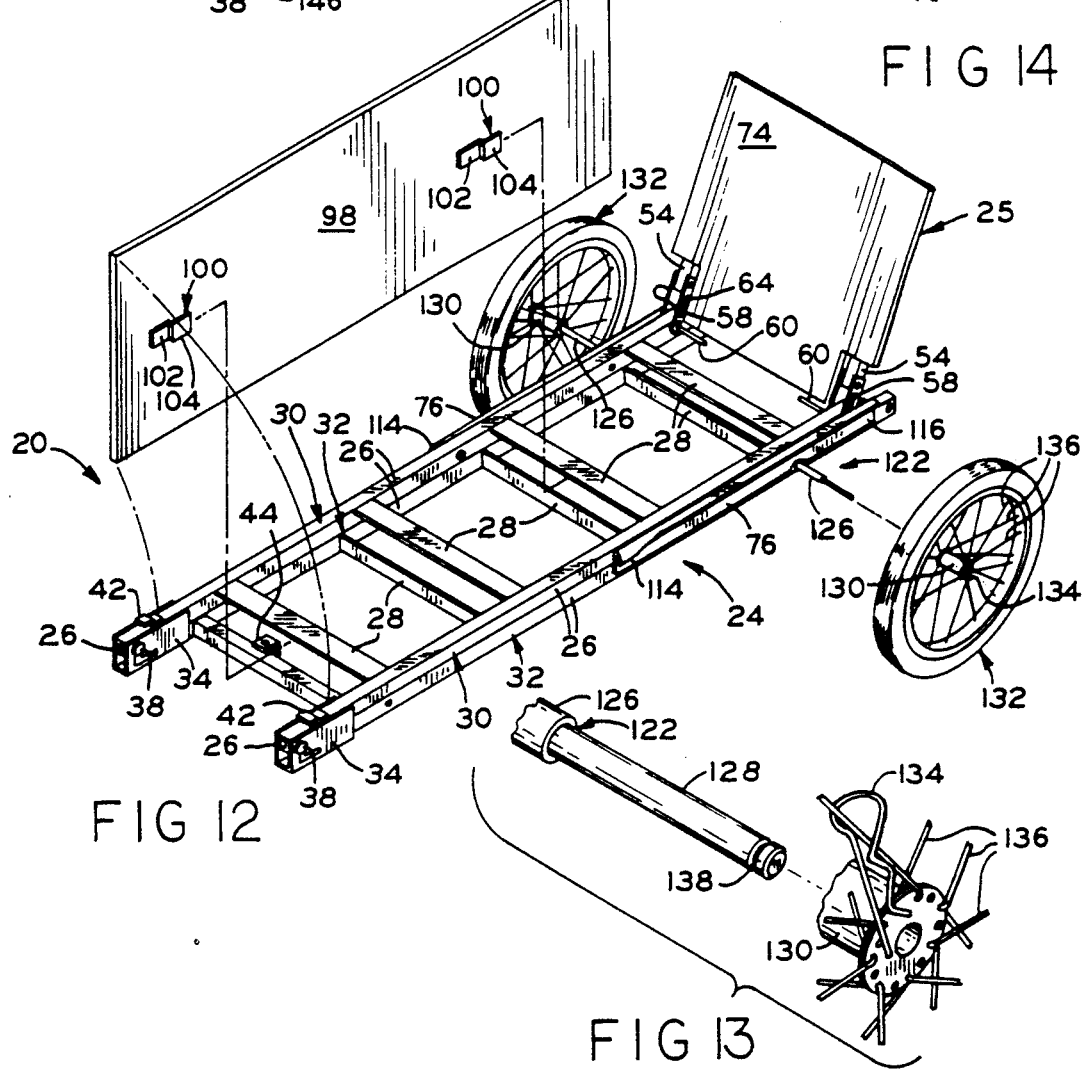
FIG 12
FIG 13

DEVICE FOR HUNTING LARGE AND SMALL GAME

BACKGROUND OF THE INVENTION

The present invention relates generally to game hunting and more particularly to stands or supports which are readily convertible to carts for transporting game and equipment.

Hunters often utilize tree stands as hunting platforms when hunting large game such as deer or elk. As is well known by hunters, tree stands provide many practical advantages, such as allowing a hunter an unobstructed view of a broad area of the woods, thereby enhancing the hunter's chances of success. In addition, it has been found that the chances of the hunter being sighted or scented by an animal are greatly reduced if the hunter is in an elevated position.

Tree stands have developed as the sport of hunting has gained popularity. Essentially, the tree stand is designed to be leaned against and anchored relative to the trunk of a tree. A typical stand includes a foldable ladder for vertical access and a collapsible seat or platform for obtaining a comfortable and safe position while elevated.

Since the hunter is often desirous of hunting in a remote location that is not accessible by motor vehicle, he must often transport hunting equipment and heavy game by himself. Thus, there have been developed tree stands that are foldable into a single compact unit for easy transportation and storage.

In addition to hunting large game, many hunters enjoy hunting small game such as duck and geese. Small game is hunted much differently than large game primarily due to a different hunting environment. Generally, small game hunting occurs in fields and streams while large game hunting occurs in wooded areas. Due to the extremely keen sight of small game and especially geese, it is imperative that the hunter be well camouflaged against the horizon. Thus, the hunter will often lie flat on the ground or dig a shallow grave to easily surround himself with camouflage. However, in such a flat position, it is difficult for the hunter to quickly move to a shooting position.

Inasmuch as many hunters wish to hunt both large game and small game, it is desired to reduce the amount of equipment necessary for those who hunt both types of game. It is further desired to provide a hunting device that allows the hunter a better shooting position.

SUMMARY OF THE INVENTION

The present invention provides an apparatus, for use by a hunter, that is selectively convertible between a tree stand position and a reclined sitting position to allow the hunter to utilize a single apparatus for hunting both large and small game. The apparatus includes a support member, which is capable of pivoting relative to a base member, such that when the apparatus is placed in its reclined sitting position, the support member pivots to allow the hunter to assume the reclined position when hunting small game. When hunting large game, the apparatus is inverted so that the base member elevates the support member against the trunk of a tree to allow the support member to serve as an elevated support platform for a hunter.

Generally, the present invention provides a hunter's apparatus having a base member and a support member pivotally connected to the base member. The base member is extendable to its tree stand position to elevate the support member while the base member is adjacent the trunk of a tree. The apparatus is selectively inverted to a reclined sitting position with the base member sitting generally horizontally. In this position, the support member is capable of pivoting relative to the base member to a reclined position to form an obtuse angle with the base member to allow the hunter to assume a generally reclined position.

Specifically, the present invention provides, in one form thereof, such an apparatus in which the support member, while in the reclined sitting position, is spring biased to a generally upright position to aid the hunter in quickly shifting from a fully reclined position to an upright sitting position. The base member includes a first section and a second section pivotally secured to the first section to alternatively provide a U-shaped support for camouflage material so that the hunter may sit in a constant upright position when hunting small game. The apparatus may be further provided with wheels and folded to a cart position for transporting game and equipment.

An advantage of the apparatus of the present invention is that a single device is provided for elevating a hunter adjacent the trunk of a tree for hunting large game and for supporting the hunter in a reclined position for hunting a small game.

Another advantage of the apparatus of the present invention is that the hunting device is convertible into a hand-operated cart for carrying game and equipment.

A further advantage of the apparatus of the present invention is that the hunting device is convertible into a generally U-shaped support for camouflage material and includes a seat to allow a hunter to sit in a camouflaged upright position while hunting small game.

Yet another advantage of the apparatus of the present invention is that while the device is used as a reclined support for small game hunting, the backrest or support member is spring biased to an upright position to allow the hunter to quickly shift from a reclined position to an upright position for better shooting accuracy.

The present invention, in one form thereof, comprises a hunter's apparatus selectively convertible between a tree stand position and a reclined sitting position. The apparatus includes a base member and a support member pivotally connected to the base member. The base member is extendable when the apparatus is inverted to the tree stand position to elevate the support member to serve as a support platform for the hunter. The base member includes steps for permitting the hunter to climb the support member. A brace is connected to and extends away from the base member to abut the trunk of the tree. When the apparatus is inverted to the reclined sitting position, in which the base member extends generally horizontally, the support member is capable of pivoting relative to the base member to a reclined sitting position forming an obtuse angle with the base member so that the hunter seated on the base member generally assumes the reclined position.

The present invention, in one form thereof, comprises a support apparatus for use by a hunter while hunting small game. The apparatus includes a base member and a support member pivotally connected to the base member and movable from a storage position adjacent the base member to a reclined sitting position in which the support member forms an obtuse angle with the base member and is acted upon by a spring force, so that the hunter seated in the base member generally assumes the reclined position.

The present invention, in one form thereof, further comprises such an apparatus in which the base member includes a first section and a second section pivotally connected to one end of the first section. The support member is pivotally connected to the other end of the first section. While the first section is generally horizontal, the support member and the second section are pivoted and locked at generally right angles to the first section to provide a generally U-shaped support for camouflage material. In yet another position, a pair of detachable wheels are rotatably connected to and support one end of the base member while the base member extends generally horizontally. A handle is attached to the opposite end of the base member to provide a hand-operated cart for transporting game and equipment.

BRIEF DESCRIPTION OF THE DRAWINGS

FIG. 1 is a perspective view of the hunting device of the present invention in which the device is in its tree stand position relative to the trunk of a tree;

FIG. 2 is an enlarged fragmentary side view of the tree stand of FIG. 1;

FIG. 3 is an enlarged side view of the seat of FIG. 1;

FIG. 4 is an isolated view of the seat of FIG. 3 in its generally folded position;

FIG. 5 is an enlarged sectional view of the seat of FIG. 4 taken along line 5—5 of FIG. 4;

FIG. 6 is a side view of the hunting device while in the reclined sitting position and showing a hunter being supported by the device in a completely reclined position, and alternatively showing the device in a partially reclined position;

FIG. 7 is an enlarged side view of the spring loaded portion of the device of FIG. 6, particularly showing the device in a completely reclined position;

FIG. 8 is the device shown in FIG. 7, particularly showing the device in its spring biased upright position;

FIG. 9 is the device of FIG. 6, particularly showing the device in a position for hauling large game, and alternatively in a fixedly reclined position for small game hunting;

FIG. 10 is a perspective view of the hunting device of the present invention while in its position as a generally U-shaped support for camouflage material;

FIG. 11 is a perspective view of the hunting device of the present invention after conversion to a hand-operated cart;

FIG. 12 is an exploded view of the hunting device of FIG. 11;

FIG. 13 is an enlarged view of the wheel axle assembly of FIG. 12; and

FIG. 14 is an enlarged view of the wheel attached to the axle, particularly showing the clip for retaining the wheel on the axle.

DESCRIPTION OF THE PREFERRED EMBODIMENT

For purposes of clarity, the hunting device of the present invention that is selectively convertible between a tree stand position and a reclined sitting position is generally designated by reference numeral 20. Referring initially to FIG. 1, hunting device 20 is shown in its tree stand position adjacent tree 22. In its tree stand position, hunting device 20 generally includes a base member 24 and a support member 25 pivotally attached to the elevated end of base member 24. Base member 24 includes opposite side stiles 26 interconnected by a plurality of evenly spaced rungs 28 extending and secured between stiles 26. Base member 24 further includes an upper section 30 and a lower section 32. Stiles 26 of sections 30 and 32 are connected by coupling brackets 34.

Referring to FIG. 2, coupling bracket 34 is generally U-shaped and extends axially a length sufficient to connect stiles 26 of upper section 30 and lower section 32. More particularly, coupling bracket 34 is secured to lower section 32 by bolts 36. Coupling bracket 34 is pivotally attached to upper section 30 by pins 38. Coupling bracket 34 further includes an L-shaped slot 40 to allow lower section 32 to pivot relative to upper section 30. A locking clip 42 is secured to stile 26 of upper section 30 and locks lower section 32 in axial alignment with upper section 30. An L-shaped bracket 44 is attached to a rung 28 on lower section 32 and includes an aperture (not shown) into which is inserted an adjustable spacing rod 46 which is secured within tree 22 at its pointed edge 48. Spacing rod 46 is adjustable to varying lengths so that a desired spacing is achieved regardless of the shape or bend of the tree. As shown in FIG. 1, a rod 50 extends axially beyond bottom rung 28 to prevent base member 24 from sinking into the ground while the device is adjacent a tree. A strap 52 is wrapped around tree 22 and the second uppermost of rung 28 of upper section 30 as shown in FIG. 1 to brace base member 24 against tree 22.

As best shown in FIG. 10, support member 25 includes opposite side stiles 54 interconnected by equally spaced rungs 56. Referring again to FIG. 2, stiles 54 of support member 25 are pivotally connected to stiles 26 of base member 24 by coupling brackets 58. Stiles 26 of upper section 30 are pivotally attached to coupling brackets 58 by pins 60. Stiles 54 are attached to coupling brackets 58 by pins 64 which are slidable within slots 62 to allow support member 25 to move axially with respect to coupling brackets 58. Locking clips 66 are secured to stiles 54 by bolts 68 to lock stiles 54 in axial alignment with coupling brackets 58 thereby preventing axial movement of support member 25 with respect to coupling brackets 58. Rung 56 on the cantilevered end of support member 25 is reinforced by a generally tubular brace structure 70 which houses tree spikes 72. Tree spikes 72 extend through apertures (not shown) in rung 56 to engage tree 22 thereby bracing support member 25 against tree 22. As best shown in FIGS. 1, 2, and 10, a board 74 is placed over stiles 54 and rungs 56 of support member 25 so that support member 25 may serve as a platform for the hunter. Opposite bracing bars 76, as shown in FIGS. 1 and 2, are fixedly attached to stiles 26 and removably attached to stiles 54 by pins 77 and provide added support for the hunter while on platform 74.

As shown in FIGS. 1, 3, and 4, a seat 78 is fixedly supported to tree 22 at a position elevated from support member 25. Seat 78 allows the hunter to sit on seat 78 while resting his legs on platform 74. Referring in particular to FIGS. 3-5, seat 78 includes a pair of spaced apart L-shaped channel members 80. A downwardly extending U-shaped channel member 82 is axially received between downwardly extending sides 81 of channel members 80. A rod 84 is pivotally secured to L-shaped channel members 80 at its pivoted end by a pin 86. The free end of rod 84 is pointed for insertion into the trunk of a tree. The horizontal sides 90 of channel members 80 abut the bottom surface of board 88 and are secured thereto by screws (not shown) to secure board 88 to L-shaped members 80. When not in use, rod 84 may be pivoted within channel member 82 to a storage position as shown in FIG. 4.

U-shaped channel 84 pivots at pin 92 between a vertical position while seat 78 is attached to tree 22 as shown in FIG. 3 and a folded horizontal position as shown in FIG. 4, in which rod 84 fits generally within U-shaped channel 84 for storage. By pivoting to a vertical position, channel 82 provides proper alignment of seat 78 with respect to tree 22. Channel 84 has an opening therein (not shown) through which rod 84 extends while channel 82 is in the vertical position. A stop member 94, such as a nail welded to the bottom surface of rod 84, maintains channel 82 in its vertical position while seat 78 is attached to tree 22. A strap member 96 is attached to channel 82 and wrapped around tree 22, as shown in FIGS. 1 and 3, to secure seat 78 to tree 22.

Referring to FIG. 6, there is shown hunting device 20 which has been converted into a reclined sitting position for small game hunting. As shown, upper section 30 of base member 24 has been folded over lower section 32 to shorten the length of base member 24 to allow the hunter to lie flat on device 20. A board 98 is placed on upper section 30 to provide a more comfortable support for the hunter. As best shown in FIG. 12, the bottom surface of board 98 includes a pair of flexible clips 100, each having an attached portion 102 and a cantilevered portion 104, which is slightly displaced from the surface of board 98. Cantilevered portion 104 of each clip 100 slidingly fits below its associated rung 28 to removably secure board 98 on upper section 30 of base member 24.

Referring again to FIG. 6, support member 25 is shown in a completely reclined position with a hunter assuming this reclined position. Referring to FIGS. 7 and 8, there are shown the two resting positions for device 20 while the device is in a reclined sitting position having a spring biased force attached thereto. To achieve this force, a spring 106 is slidably secured to each pin 60 as shown. Each spring 60 includes a generally coiled portion 108 and two leg portions, a long leg portion 110 and a short leg portion 112. In order to bias support member 25 in a generally upright position as shown in FIG. 8, short leg 112 is inserted beneath rung 28 to create a constant downward force on short leg 112, which pulls long leg 110 to a generally vertical position. Since long leg 110 is placed beneath rung 56 on support portion 25, long leg 110 of spring 106 maintains support portion 25 in a generally vertical position as shown in FIG. 8. In order for the hunter to rest in a completely reclined position as shown in FIG. 6, the hunter merely lays flat against support member 25 which forces long leg 110 of spring 106 and consequently support portion 25 to move to a generally horizontal position. When it is desired to move from a fully reclined position into a generally upright position, the hunter sits up to remove the downward force on long leg 110 so that the downward pressure on short leg 112 of spring 106 will tend to force long leg 110 into a generally vertical position, thus aiding the hunter in moving to a fully upright position to enable the hunter to shoot with more accuracy.

If it is not desired to shift from a fully reclined position to a generally upright position, brace members 76 may be used in place of springs 106 as shown in FIG. 9. Braces 76 each includes a pivotable fixed end 114 and a moveable end 116. Moveable end 116 includes pin 77 which fits into aperture 118 (FIGS. 7 and 8) on support member 25. As illustrated in FIG. 9, brace members 76 lock support member 25 in a fixedly reclined position to allow the hunter to assume this reclined position and shoot from this position when desired.

The device as shown in FIG. 9 has a use in addition to that just described. In this position, wheels 132 can be attached to the device as will be explained later to form a cart for transporting large game. By locking brace member 25 in this partially reclined position, there is sufficient length for hauling the large game from the hunting site.

Referring now to FIG. 10, there is shown hunting device 20 in yet another configuration. In FIG. 10, hunting device 20 is shown as a generally U-shaped support including a seat 78 attached thereto to allow the hunter to sit on seat 78 in an upright position when small game hunting. More particularly, lower section 32 of base member 24 is pivoted at coupling bracket 34 at a generally right angle to upper section 30. One brace member 76 is attached to a stile 26 of lower section 32, and the other brace member 76 is attached to a stile 54 of support member 25 as shown in FIG. 10. Seat 78 is positioned between the two uppermost rungs 56 of support member 25. In particular, seat 78 is unfolded to its position as shown in FIG. 3 and U-shaped channel member 82 snaps snugly and securely between brace structure 70 and second rung 56. In order to add height to top section 25, rod 122, which also serves as an axle, and rod assembly 124, which serves as a pull handle are frictionally inserted into the axial ends of stiles 54 as shown in FIG. 10.

Referring to FIGS. 11-14, hunting mechanism 20 is shown as a cart for transporting game and equipment. Referring in particular to FIGS. 11 and 12, upper section 30 is folded over lower section 32 at coupling bracket 34 in the same manner as shown in FIG. 6. Board 98 is attached to upper section 30 of base member 24, and support member 25 is fixedly secured to a position approximately 90° with respect to base member 24. Axle 122 is slid through the bottom rung 28 of lower section 32 in a manner similar to rod 50 as shown in FIG. 1. Axle 122 includes a stop flange portion 126 centrally located along the axial length of axle 122. Axle 122 also includes opposite reduced diameter portions 128 which telescopingly fit into hub 130 of wheel 132. Wheel 132 is secured to axle 122 by retaining clip 134, such as a cotter pin as pictured in FIGS. 13 and 14. Hub 130 slides over reduced diameter portion 128 until it comes to rest against stop flange portion 126. Retaining clip 134 is then attached to a spoke 136 of wheel 132 and further attached to grooved portion 138 of reduced diameter portion 128 as shown in FIG. 14. In order to pull the cart, pull handle 124 is inserted into L-shaped slot 40 of coupling bracket 34 as shown in FIG. 11. In particular, pull handle 122 includes two rods 140 and 142. The rods are held together by nut 144 and thumb screw 146.

In describing the manner in which hunting device 20 is converted between its various positions, the device will be initially described in its cart position as shown in FIG. 11, since it is in the cart position that the device is transported to and from the hunting environment. Once the hunter transports the cart to a desired location, the wheels are no longer needed until departure from the site. In order to remove the wheels, each retaining clip 134 is removed from axle 122 so that the clip slides along spoke 136 until it comes to rest against hub 130. While removed from axle 122, clips 134 are retained by spokes 136 to prevent the clips from being misplaced or lost. Wheels 132 are slidingly removed from axle 122, which is then itself removed from lower section 32 of base member 24. Seat 78 must then be removed from its storage position within support member 25. As shown in FIG. 11, seat 78 is stored between middle rungs 56 of support member 25. In particular, seat 78, while in its storage position as shown in FIG. 4, is inverted so that board 88 snugly fits between stiles 54 of support member 25 as well as between a rung 56 and a flexible clip 148 as shown in FIG. 11. In order to remove seat 78, U-shaped channel member 82 is grasped and pulled upwardly to overcome the force of clip 148.

After seat 78 has been removed from support member 25, pull handle 124 is removed from L-shaped slot 40. Upper section 25 is then pivoted to a 90° angle with respect to base member 24 and support member 25 is then lifted vertically so that pin 64 is moved within slot 62 of coupling bracket 58 until locking clips 66 are axially above coupling member 58. Support member 25 is then lowered until locking clips 66 engage coupling bracket 58, as shown in FIG. 10, which locks support member 25 in position. Base member 24 is then unfolded so that upper section 30 is in axial alignment with lower section 32. Once in axial alignment, lower section 32 is locked into alignment by locking clips 42 as shown in FIGS. 1 and 2. Hunting device 20 is then inverted and set against the trunk of a tree as shown in FIG. 1. Strap 52 is then wrapped around the second uppermost rung 28 of base member 24. In addition, strap member 52 is wrapped on the outside of bracing bars 76. Spacing rod 46 is then engaged against tree 22. At this point, device 20 is in a position to be ascended by the hunter. Once the hunter is supported by platform 74, seat 78 is attached to tree 22 at a desired axial position along tree 22 so that the hunter may sit on seat 78 while supporting his feet on platform 74. A second strap may be used as a safety strap for the hunter in which the hunter wraps the strap around the seat and body.

When finished hunting, the hunter converts the device back into its original cart position. If large game is to be hauled, the device, while in the cart position shown in FIG. 11 and 12, may not have the length necessary to completely support the large carcass. In this instance, support member 25 is partially reclined to the position shown in FIG. 9 to provide greater length for completely supporting the carcass.

In order to convert hunting device 20 to the reclined sitting position as shown in FIG. 6, again the device will be described initially in its cart position since the device will be in its cart position while being transported to the appropriate hunting environment. While moving to the site, the hunter may wish to transport decoys and camouflage supplies on the cart. These supplies may be secured to the cart by strap 52. Once the hunter has reached his desired location, the wheels are removed as previously explained. Again, support member 25 is rotated and locked in a 90° angle with respect to base member 24. Springs 106 are attached to pins 60 as described earlier and as shown in FIGS. 7 and 8. The hunter then lies on base member 24 and leans back on support member 25 until he is in a completely reclined position as shown in FIG. 6. In this position, the hunter covers himself with camouflage materials and waits for the game to come within shooting range. Once the game is in range, the hunter allows springs 106 to assist him in shifting to an upright position, as shown in FIG. 8, which enables the hunter to shoot with accuracy.

If the hunter desires to not use springs 106 to assist him in moving from a fully reclined position to an upright sitting position, springs 106 are removed from pins 60 and moveable ends 116 of bracing bars 76 are inserted into apertures 118 (FIG. 2) as shown in FIG. 9. The hunter then assumes the reclined position shown in FIG. 9 and may shoot from this position.

If the hunter wishes to hunt small game without assuming a reclined position at all, the device may be converted to the U-shaped support as shown in FIG. 10. In order to convert device 20 from a cart position to the U-shaped support, support member 25 and sections 30 and 32 of base member 24 are unfolded and device 20 is laid flat so that rungs 26 of base member 24 are in axial alignment with rungs 54 of support member 25. Support member 25 is then rotated and locked in a 90° angle with respect to base member 24 as heretofore described. Lower section 32 of base member 24 is also rotated at coupling bracket 34 to a 90° angle with respect to upper section 30, and bracing bars 76 are attached to rungs 54 and 26 for support as shown in FIG. 10. Seat 78 is attached to support member 25 by unfolding seat 78 to the position shown in FIG. 3 and snapping in place U-shaped channel member 82 vertically between rung 56 and brace structure 70 as described earlier. Wheels 132 may be leaned against vertical stiles 26, and a camouflage material is wrapped around the U-shaped support until the hunter, while sitting on seat 78, is sufficiently camouflaged.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hunter's apparatus selectively convertible between a tree stand position and a reclined sitting position, said apparatus comprising:
   a base member;
   a support member pivotally connected to said base member;
   said base member being extendable when said apparatus is inverted to said tree stand position to elevate said support member to serve as a support platform for the hunter, and said base member including step means for permitting the hunter to climb to said support member;
   a brace member connected to and extending away from said base member to abut the trunk of a tree; and
   means for clamping said support member and brace member against the trunk of a tree;
   wherein when said apparatus is inverted to said reclined sitting position with said base member extending generally horizontally, said support member is capable of pivoting relative to said base member to a reclined position forming an obtuse angle with said base member, whereby the hunter seated on said base member generally assumes said reclined position.

2. The apparatus of claim 1, wherein a pair of detachable wheels are rotatably connected to and support one end of said base member while said base member extends generally horizontally, and a handle is attached to the opposite end of said base member to provide a hand-operated cart for transporting game and equipment.

3. The apparatus of claim 1, wherein said support member is lockable in a locked position at generally ninety degrees with respect to said base member.

4. The apparatus of claim 1, wherein said base member includes a first section and a second section pivotally connected to one end of said first section, wherein said support member is pivotally connected to the other end of said first section, such that while said first section is generally horizontal, said support member and said second section are pivoted and locked at generally right angles to said first section to provide a generally U-shaped support for camouflage material.

5. The apparatus of claim 4, wherein a seat is generally horizontally attached to said support member within said U-shaped support to allow the hunter to sit upright within said support.

6. The apparatus of claim 1, wherein said support member is acted upon by a spring force while said support member is pivoted to said reclined position.

7. The apparatus of claim 1, wherein said step means comprises a plurality of vertically spaced rungs extending between and interconnecting opposite side stiles of said base member.

8. The apparatus of claim 1, wherein a top board is removably attached to said base member while said apparatus is in said reclined sitting position to provide continuous support for the hunter while assuming said reclined position.

9. The apparatus of claim 1, wherein a seat is secured to the tree axially above said support member while said apparatus is in said tree stand position, to enable the hunter to sit on said seat while the hunter's legs are supported on said support member.

10. A support apparatus for use by a hunter while hunting small game, comprising a base member and a support member pivotally connected to said base member and movable from a storage position adjacent said base member to a reclined sitting position in which said support member forms an obtuse angle with said base member and is acted upon by a spring force, whereby the hunter seated in said base member generally assumes said reclined position.

11. The apparatus of claim 10, wherein a pair of detachable wheels are rotatably connected to and support one end of said base member while said base member extends generally horizontally, and a handle is attached to the opposite end of said base member to provide a hand-operated cart for transporting game.

12. The apparatus of claim 10, wherein said support member is lockable in a locked position at generally ninety degrees with respect to said base member.

13. The apparatus of claim 10, wherein said support member is acted upon by a spring force while said support member is pivoted to said reclined position.

14. A hunter's apparatus selectively convertible between a tree stand mode and reclined sitting mode, said apparatus comprising:
 a base member;
 a support member pivotally connected to said base member;
 means including said base member for elevating said support member against a tree so that said support member serves as an elevated support for the hunter when said apparatus is in said tree stand mode; and
 means for pivoting said support member relative to said base member to a reclined position forming an obtuse angle with said base member while said base member extends generally horizontally so that said support member serves as a back support for the hunter when said apparatus is in said reclined sitting mode.

15. The apparatus of claim 14, wherein said base member is extendable when said apparatus is in said tree stand mode to elevate said support member, said base member including step means for permitting the hunter to climb to said support member.

16. The apparatus of claim 14, wherein a pair of detachable wheels are rotatably connected to and support one end of said base member while said base member extends generally horizontally, and a handle is attached to the opposite end of said base member to provide a hand-operated cart for transporting game and equipment.

17. The apparatus of claim 14, wherein said support member is lockable in a locked position at generally ninety degrees with respect to said base member.

18. The apparatus of claim 14, wherein said support member is acted upon by a spring force while said support member is pivoted to said reclining position.

* * * * *